(12) United States Patent
Sakai

(10) Patent No.: US 11,050,373 B2
(45) Date of Patent: Jun. 29, 2021

(54) ROTARY ELECTRIC SYSTEM

(71) Applicant: Toshiba Industrial Products and Systems Corporation, Kawasaki (JP)

(72) Inventor: Kazuto Sakai, Yokosuka (JP)

(73) Assignee: Toshiba Industrial Products and Systems Corporation, Kawasaki (JP)

(*) Notice: Subject to any disclaimer, the term of this patent is extended or adjusted under 35 U.S.C. 154(b) by 0 days.

(21) Appl. No.: 16/481,251

(22) PCT Filed: Mar. 1, 2018

(86) PCT No.: PCT/JP2018/007799
§ 371 (c)(1),
(2) Date: Jul. 26, 2019

(87) PCT Pub. No.: WO2018/159763
PCT Pub. Date: Sep. 7, 2018

(65) Prior Publication Data
US 2019/0379312 A1  Dec. 12, 2019

(30) Foreign Application Priority Data

Mar. 3, 2017 (JP) ............................. JP2017-040330

(51) Int. Cl.
*B60R 16/033* (2006.01)
*H02P 17/00* (2006.01)

(52) U.S. Cl.
CPC .................................. *H02P 17/00* (2013.01)

(58) Field of Classification Search
CPC ...... H02K 21/14; H02K 3/28; H02P 21/0089; H02P 2207/01; H02P 23/0004; H02P 2205/07; B62D 5/046; B62D 5/0481
See application file for complete search history.

(56) References Cited

U.S. PATENT DOCUMENTS

2014/0361610 A1* 12/2014 Wu .................. H02P 9/302
307/10.1

FOREIGN PATENT DOCUMENTS

| CN | 101702582 A | 5/2010 |
| JP | 8-289517 A | 11/1996 |
| JP | 2003-92900 A | 3/2003 |
| JP | 2008-193877 A | 8/2008 |
| JP | 2011-234451 A | 11/2011 |
| JP | 2011-254682 A | 12/2011 |
| JP | 2018-11376 A | 1/2018 |
| JP | 2016136702 A * | 1/2018 |

OTHER PUBLICATIONS

International Search Report dated May 29, 2018 in PCT/JP2018/007799 filed on Mar. 1, 2018.
Sakai, K. et. al., "Pole Changing of Electronics Motor with Multi Inverter," JIASC, 2016 IEE Japan, pp. 125-130, with English abstract.
Office Action dated Dec. 3, 2020 in counterpart Chinese Application No. 201880015540.3.

* cited by examiner

*Primary Examiner* — Muhammad S Islam
(74) *Attorney, Agent, or Firm* — Oblon, McClelland, Maier & Neustadt, L.L.P.

(57) ABSTRACT

A rotary electric system includes a rotary electric device that includes: a stator including a stator winding; and a rotor. The stator winding includes: a first coil group that generates a rotating magnetic field to rotate the rotor; and a second coil group that generates power with induced electromotive force due to rotation of the rotor.

11 Claims, 14 Drawing Sheets

(a)

(b)

| MODEL | IM MODEL | PM MODEL |
|---|---|---|
| NUMBER OF PHASES/ NUMBER OF POLES | 3 PHASES/4 POLES ||
| NUMBER OF SLOTS | 9 ||
| STATOR CORE OUTER DIAMETER | 120 mm ||
| ROTOR CORE OUTER DIAMETER | 60.4 mm | 60.0 mm |
| CORE LENGTH | 50 mm ||
| AIR GAP LENGTH | 0.3 mm | 0.5 mm |
| NUMBER OF TURNS | 62 ||
| COIL RESISTANCE | 0.19 Ω ||
| ROTOR BAR/MAGNET | ALUMINUM × 44 | Nd-Fe-B MAGNET |
| RATED SPEED | 1500 rpm ||
| RATED CURRENT | 2.75 Arms ||

| MODEL | POWER GENERATION (W) |
|---|---|
| IM MODEL | 1.37 |
| PM MODEL | 5,78 |

| PARAMETER | COMPARATIVE EXAMPLE | IM MODEL |
|---|---|---|
| SLIP | 0.024 | 0.05 |
| RATED SPEED (rpm) | 1464 | 1425 |
| AVERAGE TORQUE (Nm) | 0,17 | 0,17 |
| MECHANICAL OUTPUT (W) | 26.06 | 25.37 |
| POWER GENERATION (W) | | 1.79 |

FIG. 23

| MODEL | M MODEL | | PM MODEL | |
|---|---|---|---|---|
| CURRENT | 2.75 Arms | 5.50 Arms | 2.75 Arms | 5.50 Arms |
| FORCE FACTOR | 97.0% | 90.6% | 99.6% | 99.6% |

ROTARY ELECTRIC SYSTEM

TECHNICAL FIELD

The present invention relates to a rotary electric system including a rotary electric device.

BACKGROUND ART

There is a demand for improvements in efficiency and energy saving of rotary electric devices, such as motors, as a measure to solve energy and environment problems. Some rotary electric devices operate in a wide range of speed, including low speeds, medium speeds, and high speeds, for example, and studies have been made to improve the efficiency of such rotary electric devices throughout the entire operation range (see Non-patent Literature 1, for example).

CITATION LIST

Non Patent Literature

[NPL 1] Kazuto Sakai, et. al., "Pole Changing of Electronics Motor with Multi Inverter", JIASC2016, pp. 125-130

SUMMARY OF INVENTION

Technical Problem

The rated output of rotary electric devices normally corresponds to the maximum output state during continuous operation. Rotary electric devices are designed to operate with a high efficiency in the maximum output state. However, rotary electric devices often operate for long time in the state (hereinafter, referred to as a part load state) where load on the rotary electric devices is a part load and the outputs thereof are lower than the maximum output. This lowers the efficiency of rotary electric devices, thus increasing the overall energy consumption of each rotary electric device in the entire operation range. In electric or hybrid vehicles using rotary electric devices as the driving engines, for example, the aforementioned loss in efficiency of the rotary electric devices leads to reduction in mileage per charge or fuel consumption.

In the light of the aforementioned problem, an object of the present invention is to provide a rotary electric system with the loss in efficiency reduced.

Solution to Problem

According to an aspect of the present invention, a rotary electric system is provided, including: a rotary electric device including: a stator provided with a stator winding; and a rotor, in which the stator winding includes: a first coil group that generates a rotating magnetic field to rotate the rotor; and a second coil group that generates power with induced electromotive force due to rotation of the rotor.

Advantageous Effects of Invention

According to the present invention, it is possible to provide a rotary electric system with the loss in efficiency reduced.

BRIEF DESCRIPTION OF DRAWINGS

FIG. 23 is a table illustrating power factors of the PM and M models.

DESCRIPTION OF EMBODIMENT

Figure 1:
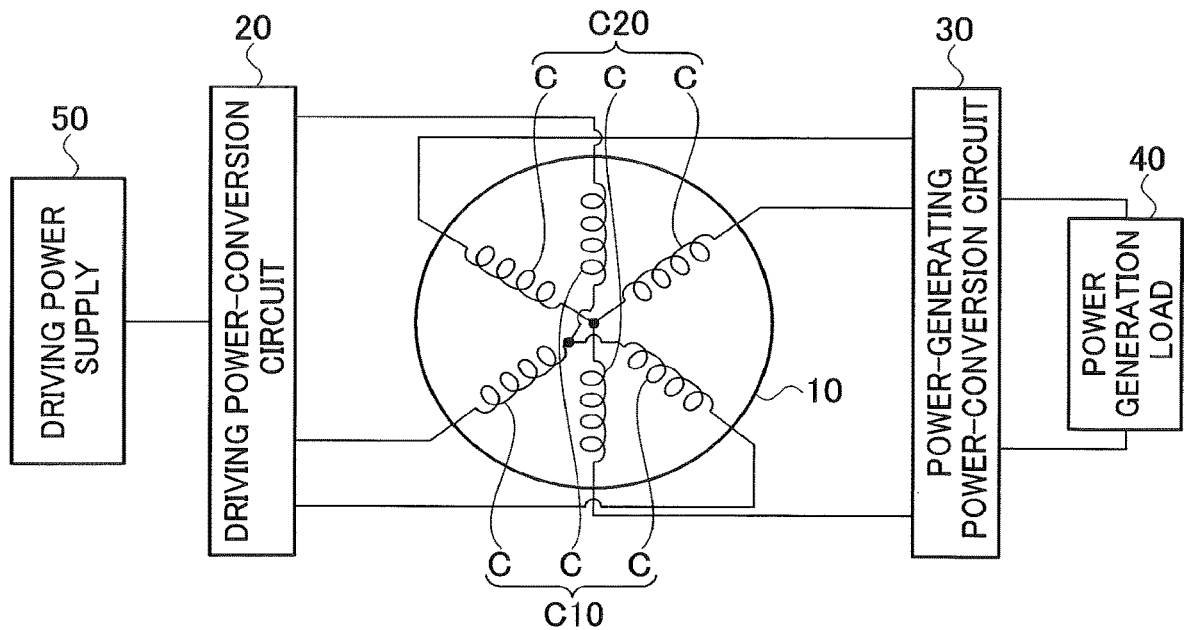
FIG. 1 is a schematic diagram illustrating the configuration of a rotary electric system according to an embodiment of the present invention.

Next, a description is given of an embodiment of the present invention with reference to the drawings. In the following description of the drawings, the same or similar portions are given the same or similar reference numerals. The following embodiment illustrates devices and methods to embody the technical idea of the present invention. Various changes can be added to the embodiment of the present invention within the claims.

As illustrated in FIG. 1, the rotary electric system according to the embodiment of the present invention includes a rotary electric device 10, a driving power-conversion circuit 20, and a power-generating power-conversion circuit 30. The rotary electric device 10 includes: a stator provided with a stator winding; and a rotor. The driving power-conversion circuit 20 and power-generating power-conversion circuit 30 connect to the rotary electric device 10. The stator winding of the rotary electric device 10 is composed of a first coil group C10 and a second coil group C20, each of which is composed of plural coils C. The driving power-conversion circuit electrically connects to the first coil group C10 while the power-generating power-conversion circuit 30 electrically connects to the second coil group C20.

The rotary electric device 10 can be configured to include the stator and the rotor inserted in the stator with air gap therebetween. For example, the rotary electric device 10 can employ the structure of induction motors, such as squirrel-cage induction motors, that includes: a stator including plural slots formed in a stator core, in which coils are provided; and a rotor in which plural rotor bars are arranged in a rotor core. Alternatively, the rotary electric device 10 can employ the structure of synchronous motors, such as permanent magnet synchronous motors, in which permanent magnets are provided in a rotor core.

The first coil group C10 generates a rotating magnetic field that rotates the rotor of the rotary electric device 10. The coils C constituting the first coil group C10 are disposed so as to generate a rotating magnetic field when applying currents of different phases to the respective coils, for example. The currents to generate the rotating magnetic field are supplied to the first coil group C10 from the driving power-conversion circuit 20. The driving power-conversion circuit 20 connects to the first coil group C10 so as to constitute a driving polyphase alternating-current circuit that rotates the rotor of the rotary electric device 10 in conjunction with the first coil group C10.

The second coil group C20 is disposed so as to generate power by induced electromotive force due to rotation of the rotor of the rotary electric device 10. The generated electric power is outputted to the outside through the power-generating power-conversion circuit 30. The power-generating power-conversion circuit 30 connects to the second coil group C20 to constitute a power-generating polyphase alternating-current circuit that outputs the generated power to the outside.

In such a manner, the stator winding of the rotary electric device 10 is separated into the first coil group C10 for motor driving operation for power running of the rotary electric device 10 and the second coil group C20 for power generating operation that allows the rotary electric device 10 to output power. The single rotary electric device 10 thereby implements a rotary electric system (hereinafter, referred to as an M&G system) that simultaneously performs both the motor driving operation to rotate the rotor of the rotary electric device 10 and the power generating operation to generate electric power.

Figure 2:
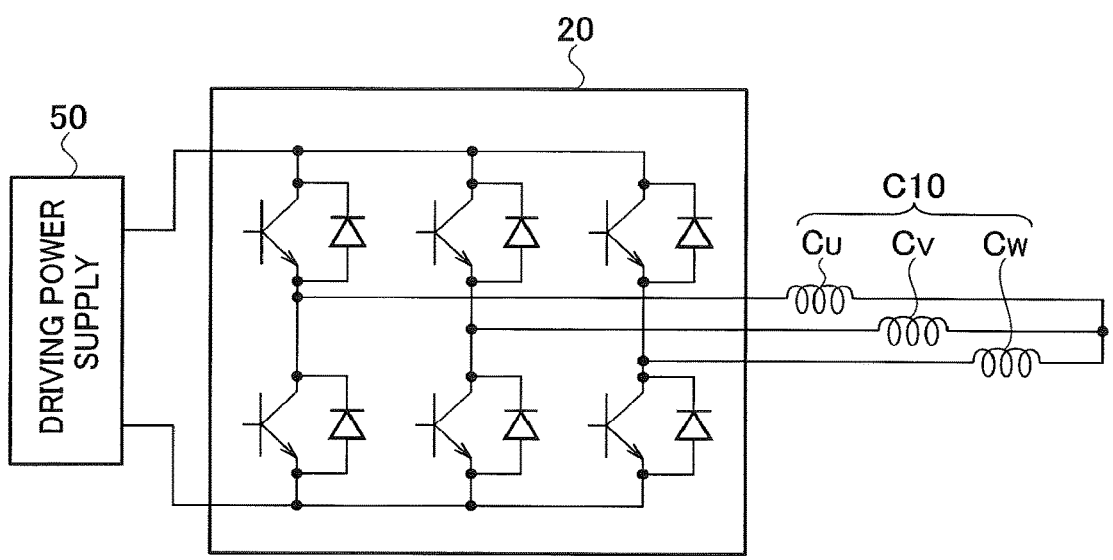
FIG. 2 is a circuit diagram illustrating an example of a driving polyphase AC circuit of the rotary electric system according to the embodiment of the present invention.

The driving power-conversion circuit 20 causes the rotary electric device 10 to perform the motor driving operation by controlling the phases of currents to be applied to the first coil group C10. When the first coil group C10 constitutes a three-phase alternating-current circuit composed of U-, V-, and W-phase coils, for example, the rotary electric device 10 performs the motor driving operation by adjusting the phases of the currents (U-, V-, and W-phase currents) to be applied to the coils of the respective phases. The driving power-conversion circuit 20 can be an inverter circuit, for example. FIG. 2 illustrates a configuration example of the driving polyphase alternating current circuit in which the first coil group C10 includes a U-phase coil $C_U$, a V-phase coil $C_V$, and a W-phase coil $C_W$ and the driving power-conversion circuit 20 is a three-phase inverter circuit. The driving power-conversion circuit 20 adjusts the current value and phase of the current to be applied to each coil of the first coil group C10 to control the torque generated by the rotary electric device 10.

In the rotary electric system illustrated in FIG. 1, power generated by the rotary electric device 10 is outputted through the power-generating power-conversion circuit 30 to a power generation load 40. When the power-generating power-conversion circuit 30 is composed of a converter circuit, for example, the power generation load 40 can be charged, or the power stored in the power generation load 40 can be returned to the rotary electric device 10 for use in rotating the rotor.

Figure 3:
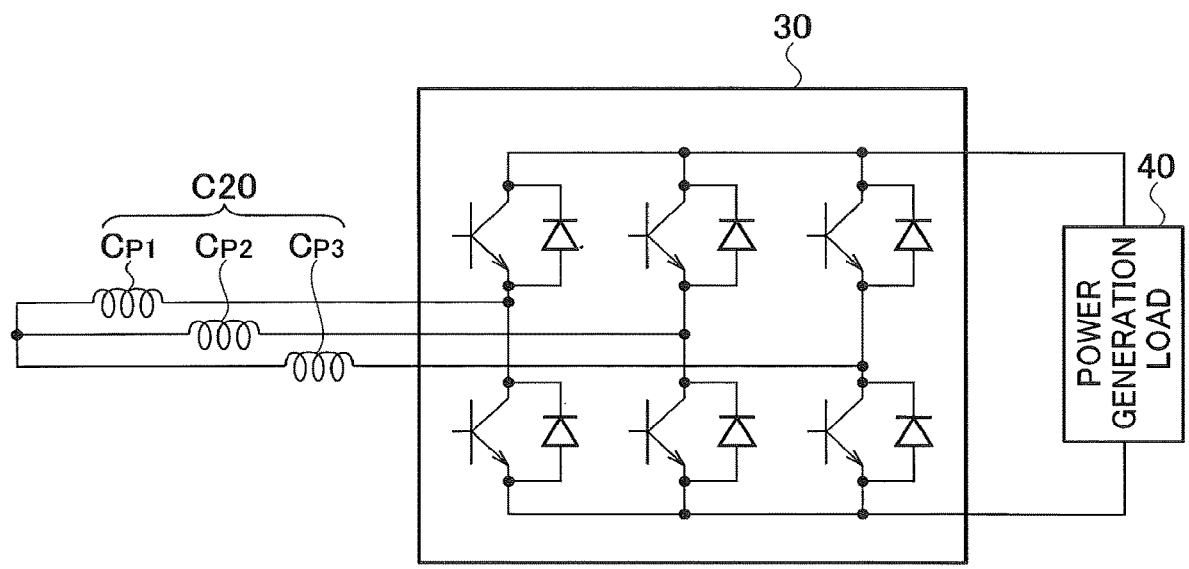
FIG. 3 is a circuit diagram illustrating an example of a power-generating polyphase AC circuit of the rotary electric system according to the embodiment of the present invention.

Adjusting the durations of on and off states of the switching element constituting the converter circuit of the power-generating power-conversion circuit 30 allows for control of the ratio of the motor driving operation to the power generating operation of the rotary electric device 10. FIG. 3 illustrates a configuration example of the power-generating polyphase alternating-current circuit in which the second coil group C20 includes power-generating coils $C_{P1}$, $C_{P2}$, and $C_{P3}$ and the power-generating power-conversion circuit 30 is a three-phase converter circuit.

As described above, in the rotary electric system illustrated in FIG. 1, the single rotary electric device is provided with the two independent polyphase alternating-current circuits. This allows the rotary electric system to simultaneously perform the motor driving operation and power-generating operation.

Figure 4:
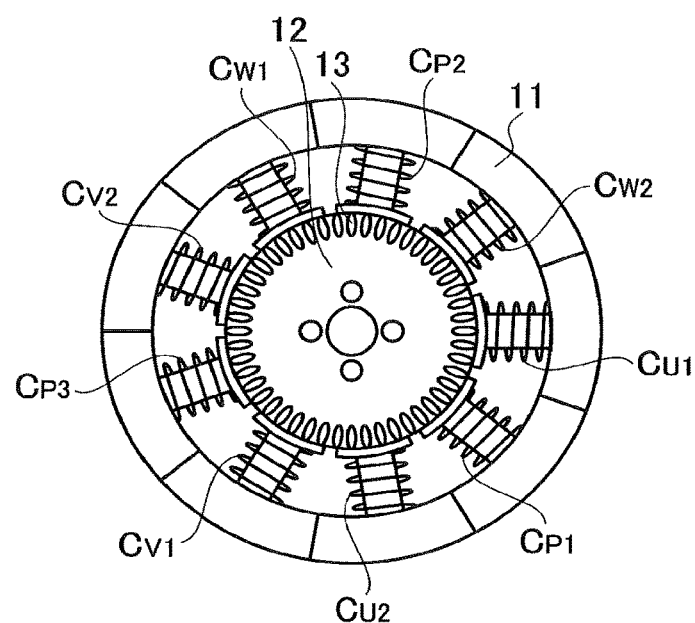
FIG. 4 is a schematic diagram illustrating an IM model to analyze the characteristic of the rotary electric system according to the embodiment of the present invention.
Figure 5:
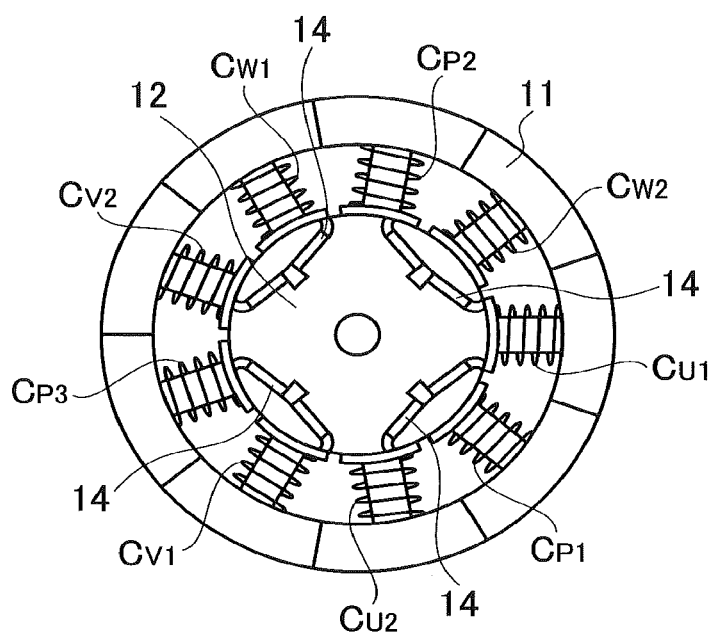
FIG. 5 is a schematic diagram illustrating a PM model to analyze the characteristic of the rotary electric system according to the embodiment of the present invention.

The following is results from analyzing the characteristics of the rotary electric system using a 9-slot concentrated winding model illustrated in FIGS. 4 and 5. In the case described below, the rotary electric system is a three-phase alternating-current system by way of example. The first coil group C10 constitutes a three-phase AC circuit used for the motor driving operation while the second coil group C20 constitutes a three-phase AC circuit used for the power generating operation.

FIG. 4 illustrates a squirrel-cage induction motor-type analysis model (hereinafter, referred to as an IM model) of the M&G system. The IM model illustrated in FIG. 4 includes: a 9-slot rotor core 11; and U-phase coils $C_{U1}$ and $C_{U2}$, V-phase coils $C_{V1}$ and $C_{V2}$, W-phase coils $C_{W1}$ and $C_{W2}$, and power-generating coils $C_{P1}$, $C_{P2}$, and $C_{P3}$, which are provided in the respective slots. The rotor has a structure in which plural rotor bars 13 are arranged along the circumferential direction of the rotor core 12.

FIG. 5 illustrates a permanent magnet synchronous motor-type analysis model (hereinafter, referred to as a PM model) of the M&G system. In the PM model illustrated in FIG. 5, the stator is the same as that of the IM model, and the rotor has a structure in which permanent magnets 14 are embedded in the rotor core 12.

In the analysis models illustrated in FIGS. 4 and 5, the power generating coils $C_{P1}$, $C_{P2}$, and $C_{P3}$, which are provided in three slots among the nine slots of the stator, constitute the second coil group C2. The coils located in the other six slots of the stator core 11 constitute the first coil group C10.

When currents of different phases are supplied from a driving power supply 50 through the driving power-conversion circuit 20 to the U-, V-, and W-phase coils of the first coil group C10, the rotor rotates, and the rotary electric device 10 performs the motor driving operation. At the same time as the motor driving operation, the rotary electric device 10 performs the power generating operation through the second coil group C20.

Figure 6:
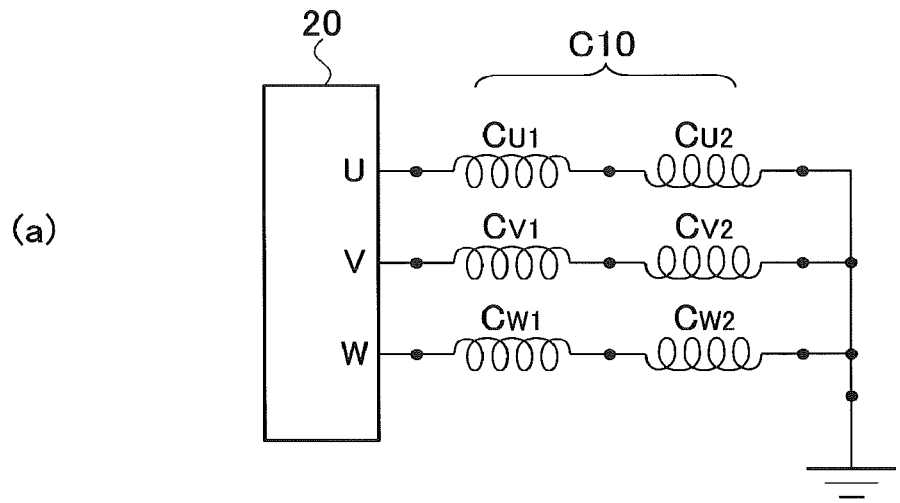
FIGS. 6(a) and 6(b) are analysis circuit diagrams of the rotary electric system according to the embodiment of the present invention, FIG. 6(a) being a circuit diagram for analyzing motor-driving operation, FIG. 6(b) being a circuit diagram for analyzing power-generating operation.
Figure 6:
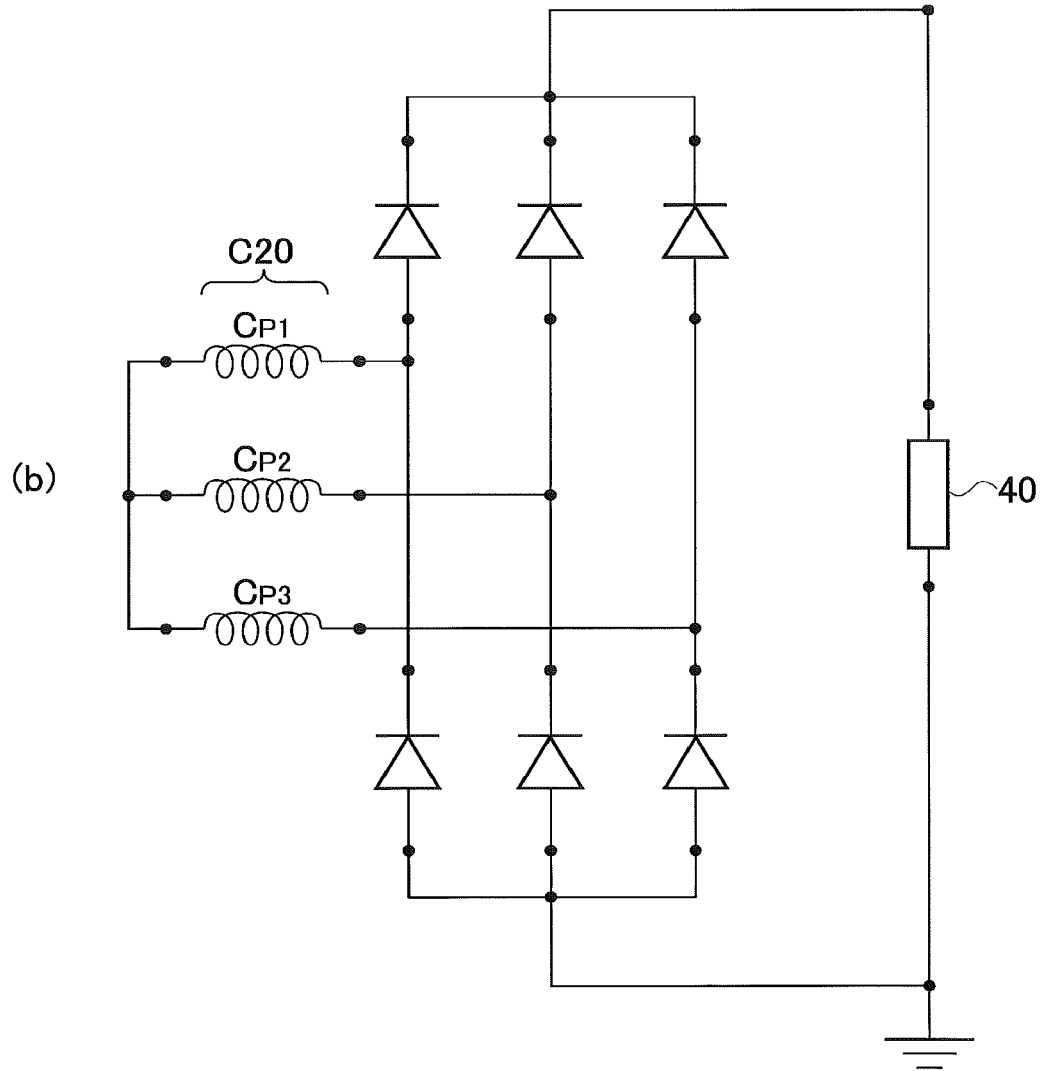
Figures 7, 8:
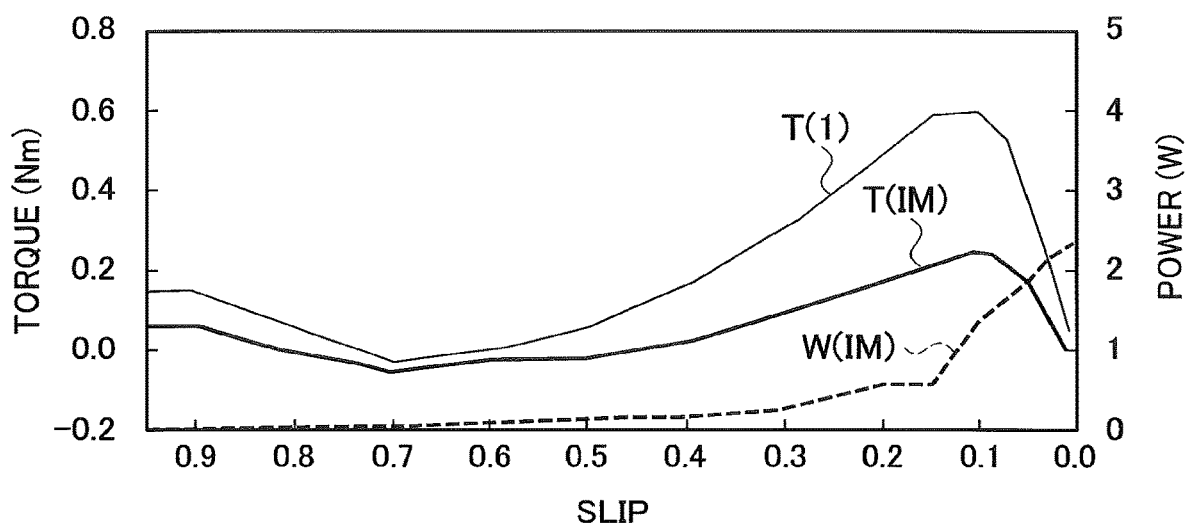
FIG. 7 is a table illustrating specifications of the IM and PM models.
FIG. 8 is a graph illustrating the characteristics of the IM model.

FIG. 6(a) illustrates a circuit for analyzing the motor driving operation by the first coil group C10. FIG. 6(b) illustrates a circuit for analyzing the power generating operation by the second coil group C20. As illustrated in FIG. 6(b), the analysis was made for the characteristics in the case where the power-generating power-conversion circuit 30 is a rectifier circuit, which connects to a load resistance as the power generation load 40. The operations of the first coil group C10 and second coil group C20 were subjected to a 2D finite element magnetic field analysis with the rated speed of the rotary electric device 10 set to 1500 rpm and the number of poles set to four. The specifications of the IM and PM models used in the analyses are illustrated in FIG. 7. The resistance value of the load resistance was set constant as 1000.

FIG. 8 illustrates torque characteristics with respect to slip values of the IM model calculated through the transient analysis. In FIG. 8, characteristic T(IM) indicates the torque characteristic of the IM model, and characteristic T(1) indicates the torque characteristic of a rotary electric device of Comparative Example 1. Comparative Example 1 is a three-phase AC 9-slot squirrel-cage induction motor, in which all the coils disposed in the respective slots are used for the motor driving operation. The amount of power obtained by the power generating operation in the IM model is indicated by characteristic W(IM).

Figures 9, 10, 11:
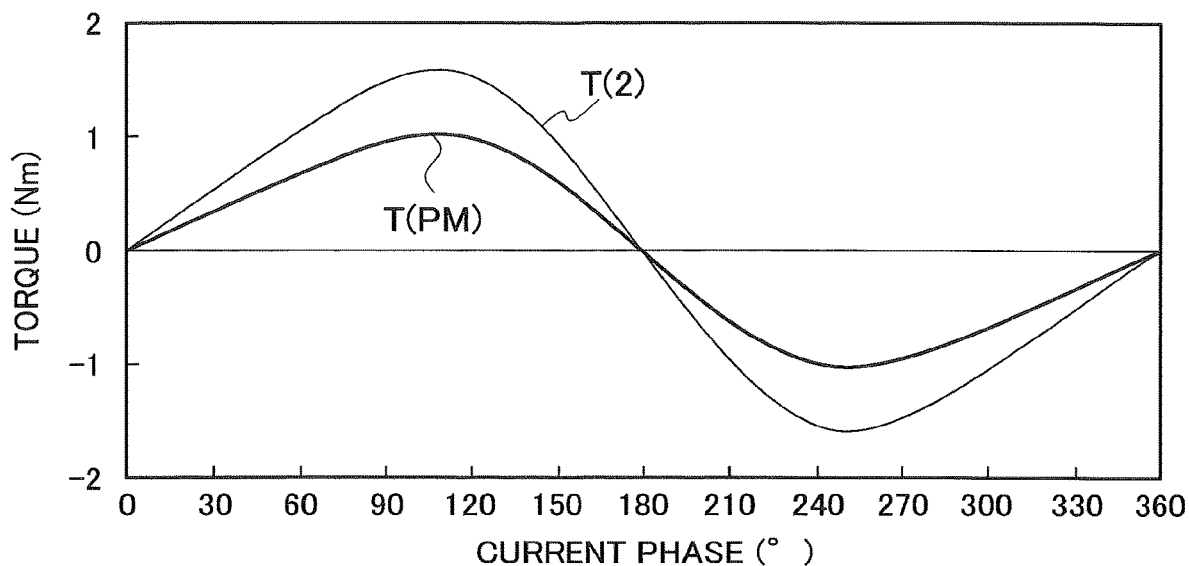
FIG. 9 is a graph illustrating the characteristics of the PM model.
FIG. 10 is a table illustrating the amount of power generated at the maximum torque.
FIG. 11 is a table illustrating the relationship between the mechanical output and the amount of power generated.

FIG. 9 illustrates torque characteristics with respect to changes in current phase of the PM model, which are calculated through a transient analysis. In FIG. 9, characteristic T(PM) indicates the torque characteristic of the PM model, and characteristic T(2) indicates the torque characteristic of a rotary electric device of Comparative Example 2. Comparative Example 2 is a three-phase AC 9-slot permanent magnet synchronous motor, in which all the coils provided in the respective slots are used for the motor driving operation.

As illustrated in FIGS. 8 and 9, the torque of the M&G system is smaller than that of the rotary electric devices of Comparative Examples. The difference in torque is due to the number of coils used for the motor driving operation. The total output of the M&G system is equivalent to that of Comparative Examples since the M&G system generates power through the power generating function.

FIG. 10 illustrates the amount of power outputted to the power generation load 40 at the maximum torque. The amount of power generated in the PM model is greater than that in the IM model since the rotor rotates in a high magnetic field due to magnets in the PM model.

Next, the total amount of the mechanical output by the motor driving operation and the amount of power generated by the power generating operation in the IM model is compared with the mechanical output by the motor driving operation of Comparative Example 1 in the stable driving region. Herein, the torque is 0.17 Nm in the stable driving region as illustrated in FIG. 8. The stable driving region herein refers to a region where the slip is smaller than that in the region of the maximum torque. The mechanical output refers to an output of the rotary electric device 10 under power running. The examination is made based on the analysis result obtained without regard to eddy current. The mechanical output and the amount of generated power which are calculated by the analysis are illustrated in FIG. 11.

As illustrated in FIG. 11, the total amount of the mechanical output and the amount of generated power in the M&G system is equal to or higher than the mechanical output of Comparative Example 1. In other words, the total output from the M&G system is not smaller than that of the rotary electric device not including any power generating function.

Figure 12:
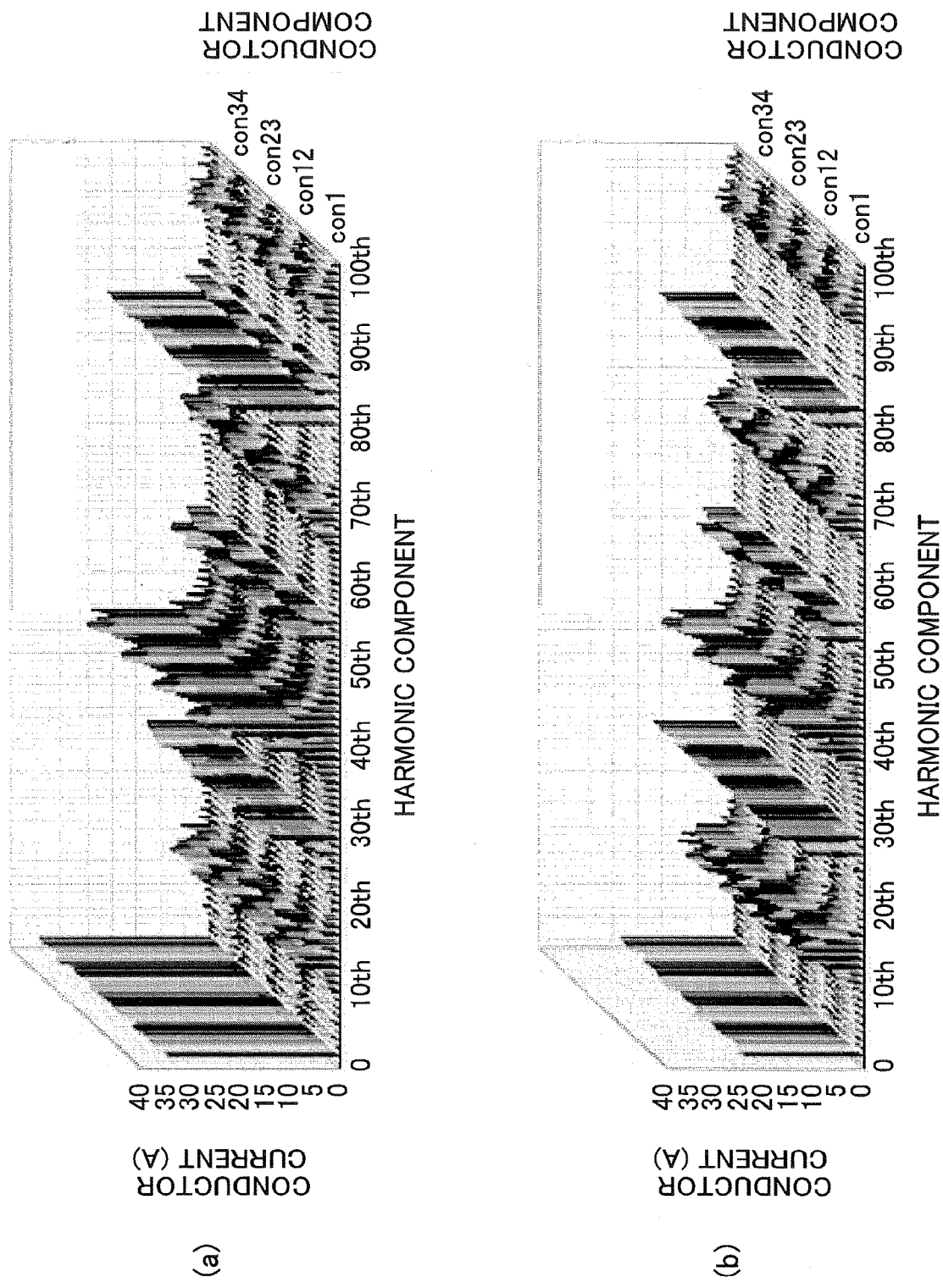
FIGS. 12(a) and 12(b) are graphs illustrating the results of FFT analyses for rotor bar current, FIG. 12(a) illustrating the analysis result of the rotary electric device of a reference example while FIG. 12(b) illustrating the analysis result of the IM model.

FIGS. 12(a) and 12(b) illustrate the results from fast Fourier transform (FFT) analyses for current of the rotor bars 13 for the slip value corresponding to the maximum torque of the analysis results illustrated in FIG. 8. FIG. 12(a) is the analysis result of Comparative Example 1, and FIG. 12(b) is the analysis result of the IM model. Compared with Comparative Example 1, the IM model shows decreases in fundamental waves and harmonic components around the $40^{th}$ order and $80^{th}$ order. The loss of the M&G system is therefore smaller than that of Comparative Example 1. If the decreases of the harmonic components are due to reverse rotation of the rotor, it is thought that the reverse rotation contributes to the power generating operation, enhancing the power generation.

As described above, in the rotary electric device system according to the embodiment of the present invention, some of the series of coils arranged along the circumference of the rotor of the rotary electric device 10 are used for the motor driving operation while the other coils are used for the power generating operation. This allows the rotary electric device 10 to simultaneously perform the motor driving operation and power generating operation in the part load state. The rotary electric device is therefore put into the full power state, implementing high efficiency operation.

According to the rotary electric system illustrated in FIG. 1, it is therefore possible to reduce the energy consumption and reduce the loss in efficiency. The rotary electric system is effective on improvements in electric and fuel consumptions of electric and hybrid vehicles, increasing the mileage per charge, for example.

When the power-generating power-conversion circuit 30 is composed of a converter circuit and connects to a battery, the electric power generated by the power generating operation charges the battery. The power stored in the battery can be used in the motor driving operation at the maximum output, for example.

In the rotary electric system according to the embodiment, by adjusting the configurations of the first and second coil groups C10 and C20, the ratio of the outputs by the motor driving operation and power generating operation is selected so as to implement a high efficiency, based on the output and speed of the rotary electric device 10. This improves the efficiency across the wide range of outputs from low to high output and the wide range of speeds from low to high speed.

Facilities using motors, such as elevators, does not operate when external power supply stops due to power outage or the like. However, when the rotary electric system according to the embodiment is applied to such facilities, the facilities are operated with batteries charged by the power generating operation. It is therefore possible to move elevators stopped due to power outage to predetermined floors or prevent people from being trapped in elevators, for example.

In the above description, the case where the rotary electric device 10 has nine slots is examined. However, it is certain that the number of slots can be other than nine. When the first coil group C10 and second coil group C20 constitute three-phase AC circuits, for example, the total number of slots can be another multiple of three.

The first and second coil groups C10 and C20 may also constitute AC circuits other than three-phase AC circuits. Specifically, the first coil group C10 needs to constitute a polyphase AC circuit generating a rotating magnetic field that rotates the rotor while the second coil group C20 constitutes a polyphase AC circuit that generates power by induced electromotive force due to rotation of the rotor.

The numbers of coils of the first and second coil groups C10 and C20 can be set to proper values depending on the torque required for the rotary electric system and the like. To drive a vehicle that needs large torque but does not need high speed movement, for example, the number of coils constituting the first coil group C10 is increased while the number of coils constituting the second coil group C20 is reduced. On the other hand, to drive a vehicle that needs high speed movement but does not need large torque, the number of coils constituting the first coil group C10 is reduced while the number of coils constituting the second coil group C20 is increased.

Figure 13:
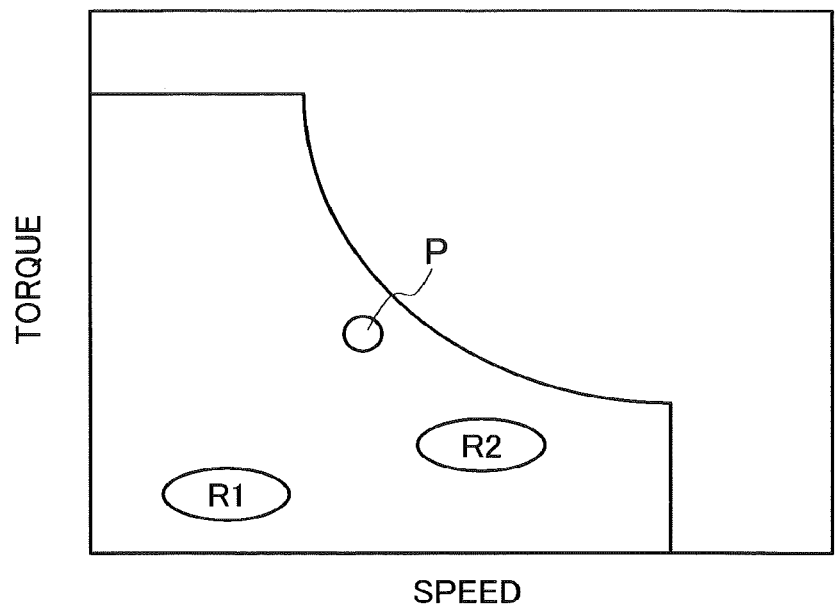
FIG. 13 is a graph illustrating the relationship between speed and torque.

FIG. 13 illustrates the relationship between the speed and torque of a vehicle. In FIG. 13, the efficiency is maximized at the position indicated by a point P. The efficiency is lowered with the distance from the point P. As illustrated in FIG. 13, the efficiency is not the maximum either in a low-speed region R1 or a high-speed region R2. This is to keep the efficiency at a certain level or higher in all the regions of low-speed to high-speed movements.

In a rotary electric device not including a power generating function, the differences between the efficiencies in the low-speed and high-speed regions R1 and R2 and the maximum efficiency correspond to the loss in efficiency. However, the M&G system utilizes the difference between the efficiencies in the low-speed and high-speed regions R1 and R2 and the maximum efficiency for power generation, so that the loss in efficiency is reduced.

Figure 14:
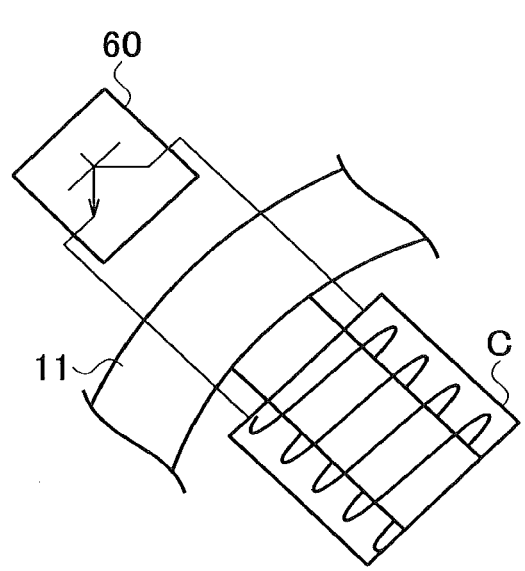
FIG. 14 is a schematic diagram illustrating an example where a power-conversion circuit connects to each coil of a rotor winding.

The stator of the rotary electric device 10 may be provided with a stator winding including plural single-phase coils. As illustrated in FIG. 14, for example, each coil C of the stator winding connects to corresponding one of power-conversion circuits 60 that are independent of each other. In the example illustrated in FIG. 14, each of the power-conversion circuits 60 is composed of a full-bridge single-phase inverter circuit. The power-conversion circuits 60 individually changes the magnitude and phase of the current flowing through the corresponding coil C. It is therefore possible to change the number of phases or the number of poles of the rotary electric device 10 depending on the load of the motor driving operation and the load of the power generating operation. It is also possible to arbitrarily set the coils constituting the first coil group C10 and the coils constituting the second coil group C20.

In normal optimized designs of rotary electric systems to satisfy the operation specifications, the efficiency is maximized around the rated output and is significantly reduced in the part load state. The rotary electric system according to the embodiment of the present invention therefore performs the motor driving operation at the continuous rated output using the first coil group C10 while performing the power generating operation or motor driving operation using the second coil group C20, improving the system efficiency.

In application systems driven using motors, simultaneously performing the motor driving operation and power generating operation yields energy-related merits. The operations of the rotary electric system according to the embodiment in such a case are described below using representative application systems.

[First Application System]

Figure 15:
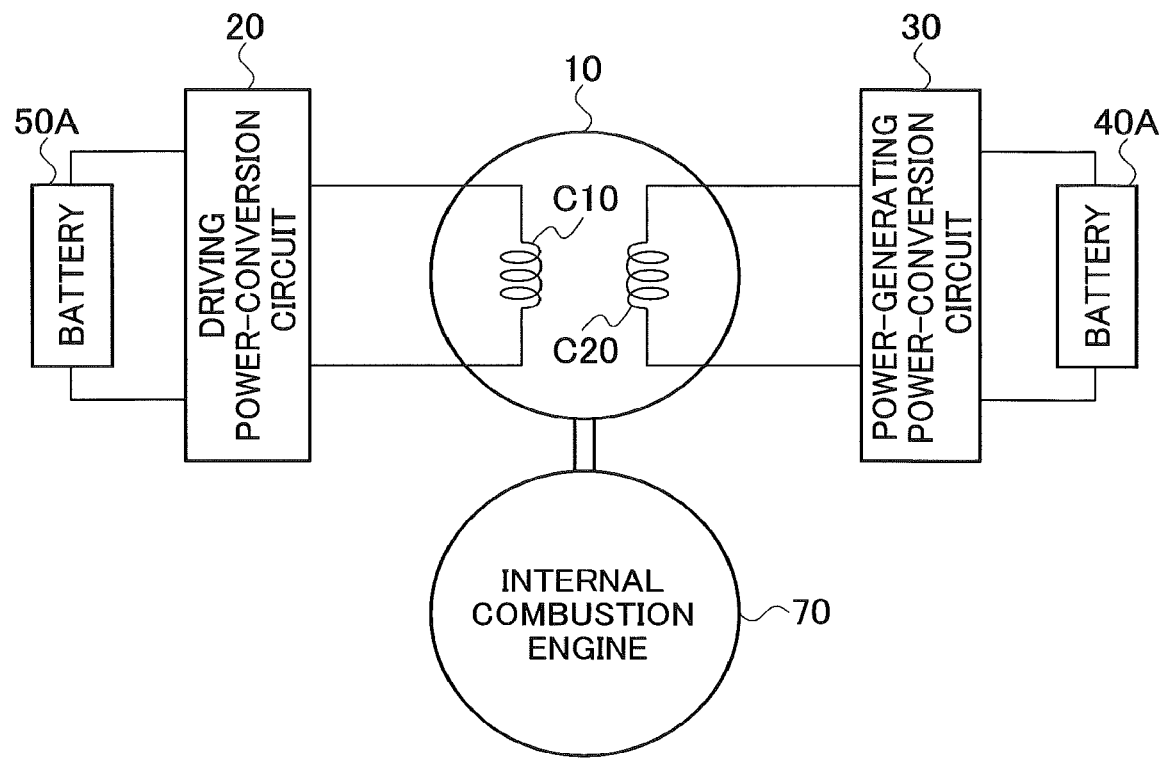
FIG. 15 is a schematic diagram illustrating a first application system of the rotary electric system according to the embodiment of the present invention.

FIG. 15 illustrates an application system example for hybrid vehicles including the rotary electric system according to the embodiment that is combined with an internal combustion engine 70. The vehicle is driven by the rotary electric device 10 and internal combustion engine 70. The power generation load 40 is a battery 40A, and the driving power supply 50 is a battery 50A. The driving power-conversion circuit 20 is an inverter/converter circuit, and the power-generating power-conversion circuit 30 is a converter/inverter circuit.

In the application system illustrated in FIG. 15, the rotary electric system performs the driving operation (power running) as a motor when the vehicle starts moving and performs the motor driving operation and the power generating operation as a power generator when the vehicle is moving. The rotary electric system performs the motor driving operation when the vehicle is accelerating or moving on expressways. The rotary electric system performs the power generating operation when the brake is being applied for deceleration or stop. Herein, the rotary electric system enters the mode in which the motor driving operation and power generating operation are simultaneously performed as different opposite operations by the two types of coil groups, especially when the vehicle is moving. While the vehicle is moving, the output is as low as 10 to 20% of the rated output. This is an operating region of low motor efficiencies.

In this mode, the motor driving operation is performed by only the first coil group C10 while the power generating operation is performed by the second coil group C20. The first coil group C10 is therefore responsible for the total output of the motor output and the power generation output. In this process, the power generation output is controlled so that the total output equals to the rated output. The first coil group C10 thereby operates with the maximum efficiency. The generated power is stored in the battery 40A.

The efficiency of the internal combustion engine 70 is considerably lower than that of the motor, which is about 10 to 30%. The high-efficiency range of the internal combustion engine 70 is narrower than that of the motor. In a similar manner to the above description, therefore, the ratio of the motor output to the power generation output is controlled so that the rotary electric system operates at an operating point where the internal combustion engine 70 operates in the high-efficiency range. The output ratio of the output of the motor driving operation by the first coil group C10 to the output of the power generating operation by the second coil group C20 is adjusted so that the rotary electric device 10 operates at the operating point where the total efficiency of the internal combustion engine driven by the rotary electric device 10 and the rotary electric device 10 is maximized. This significantly improves the fuel consumption of hybrid vehicles.

The batteries 40A and 50A may be configured as a common battery. The common battery is configured to connect to both of the driving power-conversion circuit 20 and the power-generating power-conversion circuit 30. The DC power outputted from the common battery is converted to AC power through the driving power-conversion circuit 20 to be supplied to the first coil group C10 for use in the motor driving operation. The AC power generated by the second coil group C20 is converted to DC power through the power-generating power-conversion circuit 30 and returned to the common battery. The batter for motor driving and battery for power generation may be composed of a single battery to be shared in such a manner. The difference between the power supplied to the driving power-conversion circuit and the generated power returned from the power-generating power-conversion circuit 30 is considered as power consumed by the entire system in the battery's view. When the difference in power obtained by subtracting the generated power from the supplied power is negative, the increase in power by the power generating operation is stored in the battery.

(Second Application System)

Figure 16:
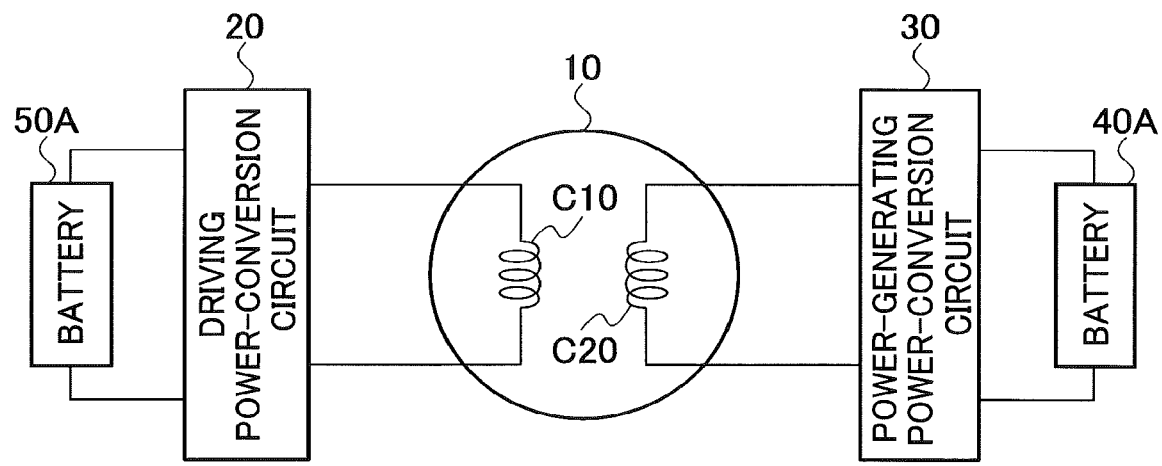
FIG. 16 is a schematic diagram illustrating a second application system of the rotary electric system according to the embodiment of the present invention.

FIG. 16 illustrates an application system example for an electric vehicle using the rotary electric system according to the embodiment. The power generation load 40 is a battery 40A, and the driving power supply 50 is a battery 50A. The driving power-conversion circuit 20 is an inverter/converter circuit while the power-generating power-conversion circuit 30 is a converter/inverter circuit.

In the application system illustrated in FIG. 16, the rotary electric device substantially continues to be driven by the first coil group C10 with a substantially constant torque corresponding to the continuous rated output and operates with a high efficiency. On the other hand, the rotary electric device operates using the second coil group C20 with the output varying. The motor driving operation and power generating operation change depending on the operation situation.

The electric vehicle needs high torque when starting, for example. The second coil group C20 therefore performs the motor driving operation so as to cover the difference between the continuous rated torque of the first coil group C10 and the high torque required at the start. When the output is average torque while the vehicle is moving, the output from the second coil group C20 is reduced to zero while the rotary electric device 10 operates with only the first coil group C10. When the necessary torque for the moving vehicle is lower than the continuous rated torque, the power generating operation is performed using the second coil group C20 with the force corresponding to the difference between the continuous rated torque and the necessary torque, and the generated power is stored in the battery 40A. The stored power is used for the motor driving operation when the vehicle starts moving or accelerates. Alternatively, the rotary electric device 10 is operated with the motor output from the first coil group C10 reduced to the necessary torque. Which pattern to employ depends on the total efficiency.

The first coil group C10, driving power-conversion circuit 20, and battery 50A thereby always output substantially steadily. When the rotary electric system is designed to yield the maximum efficiency for continuous output, the total efficiency of the rotary electric system, including the battery, is substantially maximized. This improves the power consumption due to quick changes in output of the battery and the lifetime. On the other hand, the second coil group C20, the power-generating power-conversion circuit 30, and the battery 40A is always responsible for the varying output. Furthermore, the output varies rapidly, and the direction of the energy flow during the motor driving operation is opposite to that during the power generating operation. Applying an electric double-layer capacitor instead of the battery addresses quick charge and discharge, further increasing the total efficiency or reducing the energy consumption. Systems with large maximum power capacity employ both the battery and electric double-layer capacitor.

In a similar manner to the first application system, the batteries 40A and 50A may be configured as a common battery. The difference between the power supplied to the driving power-conversion circuit 20 and the power returned from the power-generating power-conversion circuit 30 corresponds to the power consumed by the entire system. When the difference in power obtained by subtracting the generated power from the supplied power is negative, the increase in power due to the power generating operation is stored in the common battery.

(Third Application System)

Figure 17:
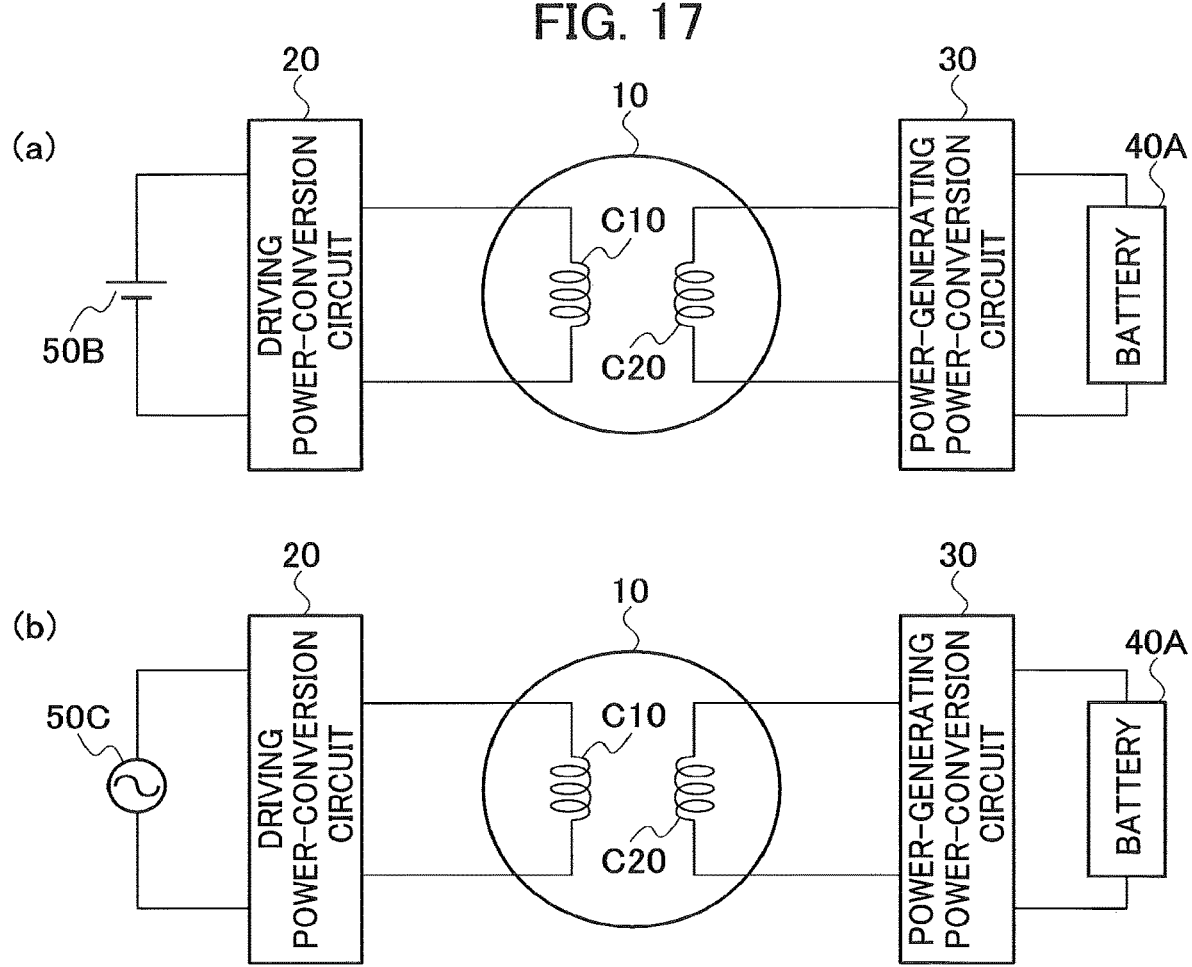
FIGS. 17(a) and 17(b) are schematic diagrams illustrating a third application system of the rotary electric system according to the embodiment of the present invention, FIG. 17(a) illustrating a case where the driving power supply is a DC power supply while FIG. 17(b) illustrating a case where the driving power supply is an AC power supply.

FIGS. 17(*a*) and 17(*b*) illustrate an application system example in which a railroad motor system includes the rotary electric system according to the embodiment. The power generation load 40 is a battery 40A, and the driving power supply 50 is a DC power supply 50B as illustrated in FIG. 17(*a*) or an AC power supply 50 as illustrated in FIG. 17(*b*). When the overhead line is for DC transmission, the driving power-conversion circuit 20 is an inverter/converter circuit while the power-generating power-conversion circuit 30 is a converter/inverter circuit. When the overhead line is for AC transmission, the driving power-conversion circuit 20 is a rectifier and inverter/converter circuit while the power-generating power-conversion circuit 30 is a converter/inverter circuit.

In the application systems illustrated in FIGS. 17(*a*) and 17(*b*), the rotary electric device 10 performs only the motor driving operation when the train starts and performs only the power generating operation when the train decelerates. When the train is moving, the rotary electric device 10 performs the motor driving operation through the first coil group C10 with a torque corresponding to the maximum efficiency point and performs the power generating operation through the second coil group C20 to store the generated power in the battery 40A or transmit the generated power to a power system through the overhead line when the battery 40A is fully charged.

In railroads, the power supply is momentarily maximized during commute hours. In such a case, using the power stored in the battery 40A by the aforementioned power generating operation prevents the maximum supply power of the power system from increasing. This can increase the momentary maximum power supply of the railroad power system or reduce the power capacity of power facilities. The same goes for the power generation during coasting operation. The application systems illustrated in FIGS. 17(*a*) and 17(*b*) are applicable to factories, buildings, driving of elevators, and the like, in addition to railroad motors.

As described above, the power-generating power-conversion circuit 30 of the rotary electric system according to the embodiment also includes a function to supply the power stored in the power generation load 40 to the second coil group C20 and generate a rotating magnetic field that rotates the rotor. The power-generating power-conversion circuit 30 and power generation load 40 implement a function to supply the power stored in the power generation load 40 to the second coil group C20 as an opposite energy flow to that in the case of storing the power in the power generation load 40 and generate the rotating magnetic field that rotates the rotor of the rotary electric device 10.

Figure 18:
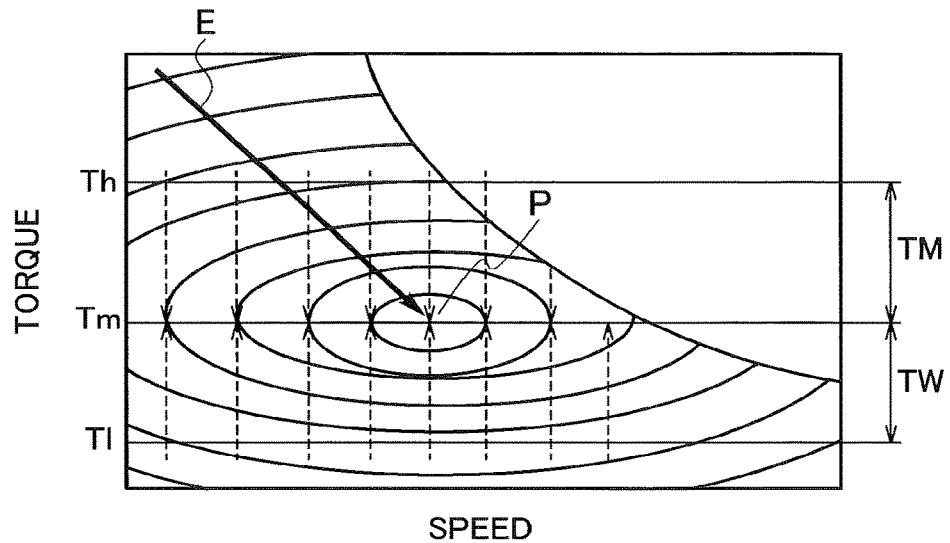
FIG. 18 is a graph illustrating operation characteristics and an efficiency distribution of the rotary electric system according to the embodiment of the present invention.

FIG. 18 illustrates shifts of an operating point for high-efficiency operation in an application system of the rotary electric system applied to an industrial system or a social system. FIG. 18 is a graph illustrating an efficiency distribution in contour lines. The vertical axis thereof indicates torque while the horizontal axis indicates speed. The graph shows operation characteristics and the operating point on the efficiency distribution. The efficiency increases in the direction of solid arrow E and is maximized at a center point P.

In FIG. 18, the difference between high torque Th at high load and continuous rated torque Tm at continuous low load corresponds to motor torque TM in the motor driving operation. The difference between the continuous rated torque Tm at continuous low load and low torque T1 at low load corresponds to power generation torque TW in the power generating operation.

The rotary electric system performs only the motor driving operation at the start-up while performing only the power generating operation during deceleration. During low load operation, the rotary electric system performs the motor driving operation through the first coil group C10 with a torque corresponding to the maximum efficiency point while simultaneously performing the power generating operation through the second coil group C20 to store the generated power in the power generation load 40A. In an industrial system such as a factory, the power stored in the battery 40A through the aforementioned power generating operation may be used for the motor driving operation in summer afternoons when the power supply from the power supply equipment of a factory or building could be momentarily maximized. This can minimize the maximum power supply from the power supply equipment. It is therefore possible to increase the short-time maximum power supply from the power supply equipment in factories, buildings, and the like. Alternatively, it is possible to reduce the power capacity of the power equipment. Furthermore, even in an instantaneous power outage, the motor driving operation is continued with the power stored in the battery, and the factory line operates without being suspended.

As described above, the operating point of the rotary electric system is shifted to a high-efficiency region by simultaneously performing the motor driving operation and power generating operation.

Next, the rotary electric system according to the embodiment is applied to an elevator-driving motor. When the load in the elevator is small, the motor performs the motor driving operation through the first coil group C10 with a torque corresponding to the maximum efficiency point while performing the power generating operation through the second coil group C20 to store the generated power in the power generation load 40A. Similarly to factories or buildings, the power stored in the battery 40A through the aforementioned power generating operation may be used for the motor driving operation in summer afternoons when the power supply from the power supply equipment could be momentarily maximized. This can minimize the maximum power supply from the power supply equipment of the elevator. It is therefore possible to increase the short-time maximum power supply from the power supply equipment of the elevator. Alternatively, it is possible to reduce the power capacity of the power equipment. Furthermore, even in an instantaneous power outage, the motor driving operation is continued with the power stored in the battery, and the elevator is able to operate during the power outage without trapping people therein.

Meanwhile, for variable-speed operation of a motor using a power supply with the voltage limited, permanent magnet synchronous motors, which are mainly used for hybrid vehicles, electric vehicles, and energy-saving devices, are able to perform variable-speed operation by flux-weakening control. The flux-weakening control is to reduce the field flux and the resultant d-axis flux by an armature reaction flux due to the d-axis current for voltage reduction. However, the q-axis flux due to the q-axis current remains, and the voltage due to the q-axis flux cannot be reduced. Because of the voltage due to the q-axis flux, it is difficult to drive the motor at high speed and high frequency even with the flux-weakening control.

The rotary electric system according to the embodiment performs the motor driving operation through the first coil group C10 and performs the power operating operation through the second coil group C20. In this case, the directions of q-axis currents thereof, that determine the magnitudes of torque and output, are opposite to each other. Specifically, the torque current of the motor driving operation is positive q-axis current when the torque (output) current of the power generating operation is negative q-axis current.

The voltages (voltage V(Lq, Iq) by q-axis inductance Lq in terms of an electric circuit) produced by the q-axis fluxes formed by the q-axis currents are components in the opposite directions. The total voltage is thereby reduced, which can be substantially zero (V(Lq, Iq)+V(Lq, −Iq)=0). Applying the rotary electric system according to the embodiment of the present invention therefore significantly reduces the resultant terminal voltage. Furthermore, the resultant voltage is composed of only the induced electromotive force by the d-axis flux due to the field flux. The difference in voltage therefore increases to the difference between the resultant load voltage and power supply voltage. This increases the maximum speed by a speed ratio corresponding to the difference in voltage and expands the variable speed range. The rotary electric system of the embodiment is able to operate in a wide variable speed range of low to high speeds.

As described above, the rotary electric system according to the embodiment performs a control to reduce the terminal voltage of the rotary electric device 10 under load by applying q-axis current to the first coil group 10 while applying to the second coil group 10, q-axis current of the opposite polarity to that of the q-axis current applied to the first coil group 10. This expands the variable speed range. The above-described matters are illustrated in voltage vector diagrams below.

Figure 19:
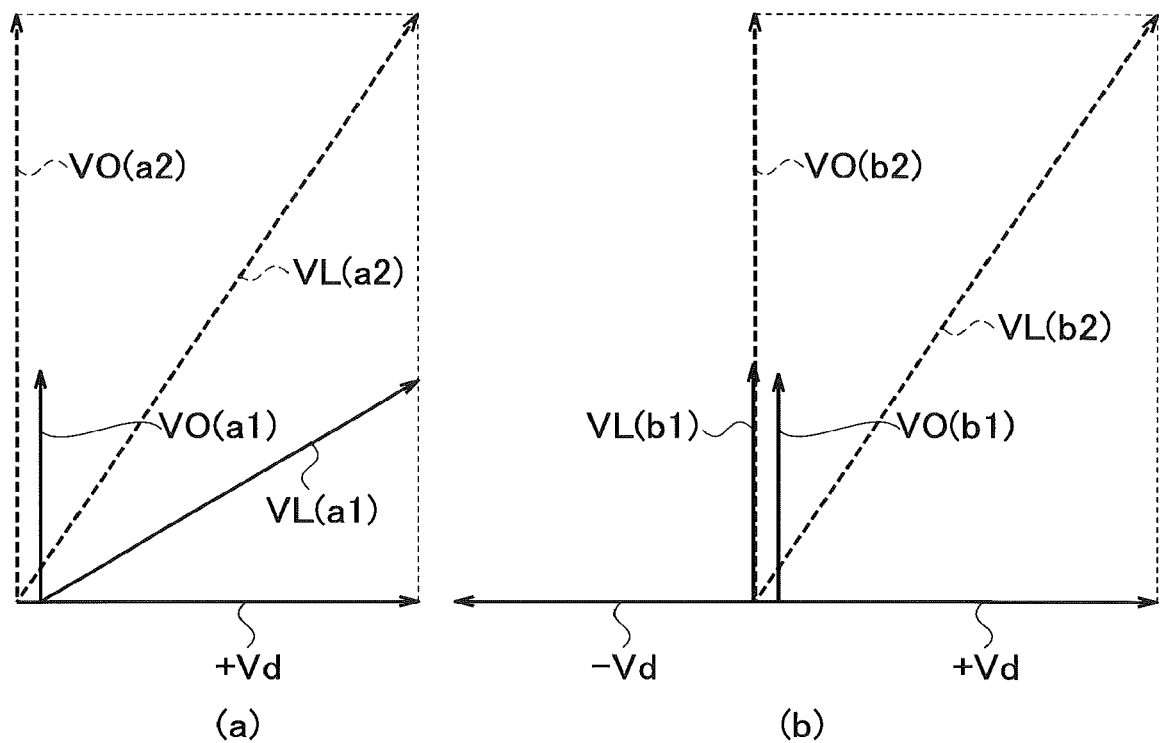
FIGS. 19(a) and 19(b) are voltage vector diagrams of the rotary electric system during medium and high speed rotation, FIG. 19(a) being a voltage vector diagram of Comparative Example, FIG. 19(b) being a voltage vector diagram of the rotary electric system according to the embodiment of the present invention.
Figure 20:
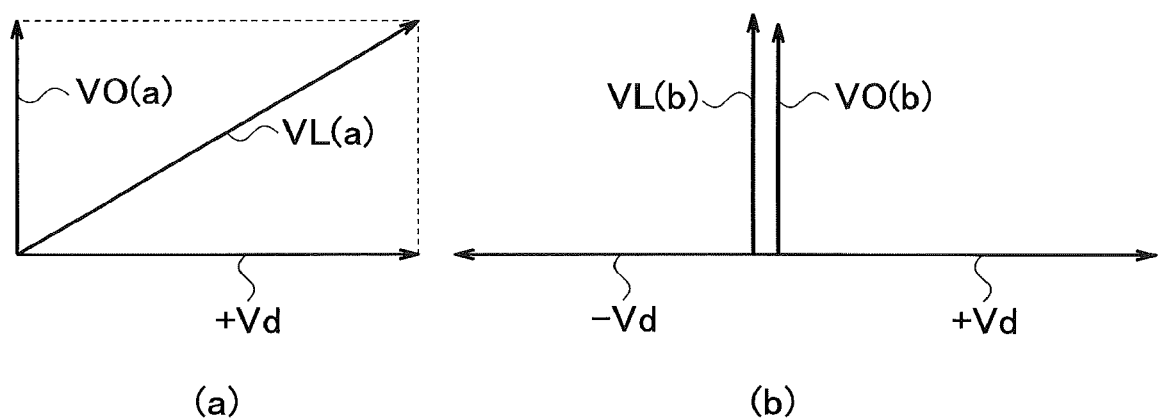
FIGS. 20(a) and 20(b) are voltage vector diagrams of the rotary electric system during low speed rotation, FIG. 20(a) being a voltage vector diagram of Comparative Example, FIG. 20(b) being a voltage vector diagram of the rotary electric system according to the embodiment of the present invention.

FIGS. 19(*a*) and 19(*b*) and FIGS. 20(*a*) and 20(*b*) are voltage vector diagrams for explaining the voltage reduction effect of applying the rotary electric system according to the embodiment to a system performing variable-speed operation drive. FIGS. 19(*a*) and 19(*b*) are voltage vector diagrams in a range of high output (medium and low torque) operation at medium to high speeds. FIGS. 20(*a*) and 20(*b*) are voltage vector diagrams in a range of high torque operation at low speeds. FIGS. 19(*a*) and 20(*a*) are voltage vector diagrams of a rotary electric system of Comparative Example that does not include a power generating function and performs only the motor driving operation. FIGS. 19(*b*) and 20(*b*) are voltage vector diagrams of the rotary electric system according to the embodiment.

In FIG. 19(a), induced voltage V0(a1) indicates induced voltage reduced by the flux-weakening control or variable magnetic force, and induced voltage V0(a2) indicates induced voltage due to the field flux without the flux-weakening control. Load voltage VL(a1) of the resultant flux reduced by the flux-weakening control or variable magnetic force is composite voltage of voltage +Vd by the positive q-axis current in the motor driving operation and the induced voltage V0(a1). The load voltage VL(a1) is greater than the induced voltage V0(a1). On the other hand, load voltage VL(a2) of the resultant flux with no flux-weakening control is composite voltage of the voltage +Vd and induced voltage V0(a2). The load voltage VL(a2) is greater than the induced voltage V0(a2).

In FIG. 19(b), induced voltage V0(b1) indicates induced voltage reduced by the flux-weakening control or variable magnetic force, and induced voltage V0(b2) indicates induced voltage with no flux-weakening control. Voltage +Vd indicates voltage due to positive q-axis current during the motor driving operation while voltage −Vd indicates voltage due to negative q-axis current in the power generating operation. As illustrated in FIG. 19(b), load voltage VL(b1) of the resultant flux reduced by the flux-weakening control or variable magnetic force is substantially equal to the induced voltage V0(b1) if the winding resistance is ignored.

Comparing the load voltage VL(a1) illustrated in FIG. 19(a) with the load voltage VL(b1) illustrated in FIG. 19(b) shows that the load voltage of the rotary electric system according to the embodiment is significantly lower than that of Comparative Example. This increases the maximum speed.

In FIG. 20(a), load voltage VL(a) of the resultant flux of Comparative Example is composite voltage of induced voltage V0(a) due to the field flux and the voltage +Vd due to the positive q-axis current in the motor driving operation. In FIG. 20(b), load voltage VL(b) of the resultant flux of the rotary electric system according to the embodiment is substantially equal to induced voltage V0(b) due to the field flux. In comparison between FIGS. 20(a) and 20(b), the load voltage of the rotary electric system according to the embodiment is significantly lower than that of Comparative Example. This can increase the maximum speed thereof.

The results from analyzing the load voltage in PM model of the M&G system and M model of Comparative Example that performs only the motor driving operation are described below. The PM model and M model are three-phase AC 9-slot permanent magnet synchronous motors.

In the M model of Comparative Example, negative d-axis current is applied for flux-weakening control. In the PM model, the current phase of the power generator side is adjusted so as to cancel only the flux in the q-axis direction.

Figure 21:
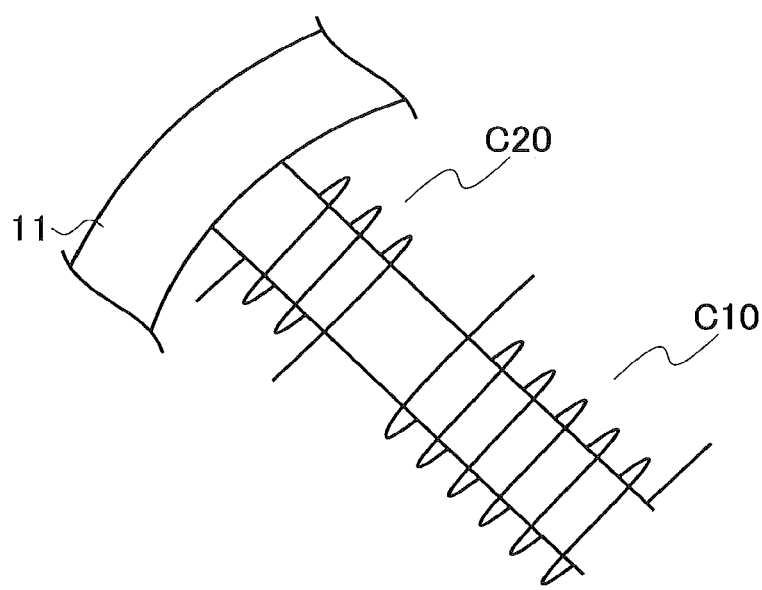
FIG. 21 is a schematic diagram illustrating an arrangement example of coils in the PM model.

As illustrated in FIG. 21, the PM model has a configuration in which both of the first coil group C10 for the motor driving operation and the second coil group C20 for the power generating operation are placed in each slot. The first and second coil groups C10 and C20 are thus disposed on the whole circumference of the rotor. The rotor thereby rotates smoothly. The coils in each slot are divided to a ratio of 2 to 1, and the coils on the center side are used as the first coil group C10 while the coils on the outer circumference are used as the second coil group C20. The first and second coil groups C10 and C20 are driven by inverter circuits, for example.

In the PM model used for the analysis, the numbers of turns of the coils of the first and second coil groups C10 and C20 are 40 and 20, respectively. In the M model, the number of turns of coils is 62.

Figure 22:
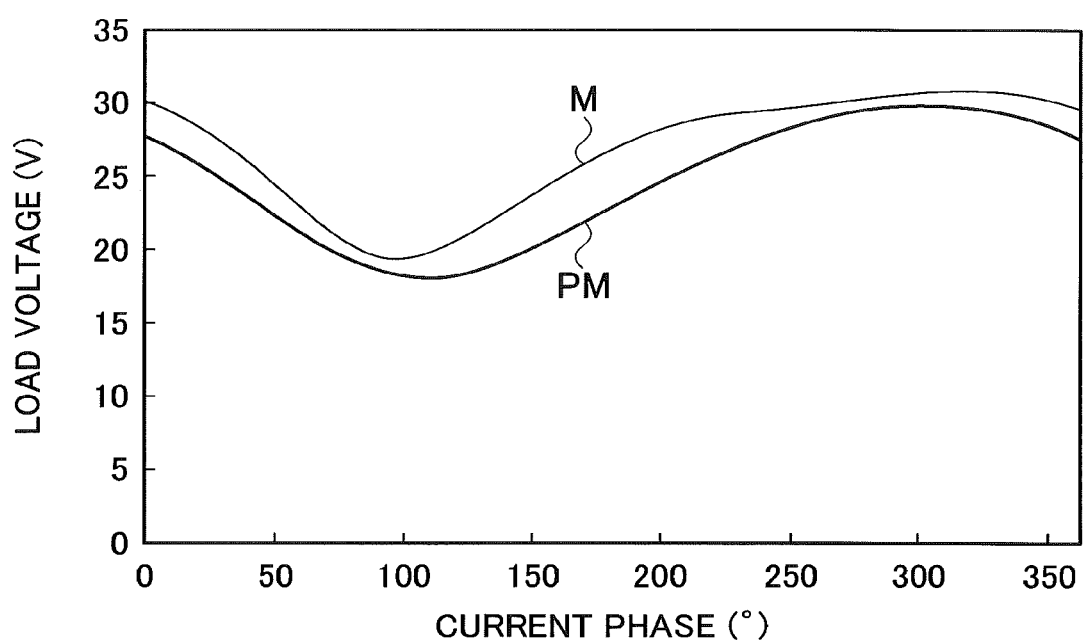
FIG. 22 is a graph illustrating the relationship between current phase and load voltage of the PM and M models.

FIG. 22 illustrates characteristics of load voltage with respect to changes in current phase of the PM model and M model. In FIG. 22, characteristic PM indicates the characteristic of the load voltage of the PM model while characteristic M indicates the characteristic of the load voltage of the M model. Since the number of turns of coils of the first coil group C10 in the PM model is two thirds of that in the M model, numerical values of the load voltage of the PM model in FIG. 22 are 3/2 times the calculated load voltages. As illustrated in FIG. 22, the load voltage is smaller in the PM model than in the M model at all current phases.

In the M model, negative d-axis current is applied for flux-weakening control. Applying such a current that does not directly contribute to motor drive reduces the efficiency. As the speed increases in particular, the negative d-axis current needs to be increased, reducing the efficiency. In the PM model, the flux in the q-axis direction is canceled by the coil for power generation to implement equivalent flux-weakening control. Since no negative d-axis current is applied in the PM model, the core loss thereof is smaller than that of the M model, so that the PM model implements high efficiency. Furthermore, the reduction in induced voltage allows for implementation of a motor of a wide output range.

FIG. 23 illustrates the results from analyzing power factors of the M model and PM model. As illustrated in FIG. 23, the power factor of the PM model is higher than that of the M model. Furthermore, in the M model, the power factor decreases when the current doubles from 2.75 Arms (the rated current) to 5.50 Arms. In the PM model, the power factor does not decrease even if the current increases in a similar manner.

First Modification

Figure 24:
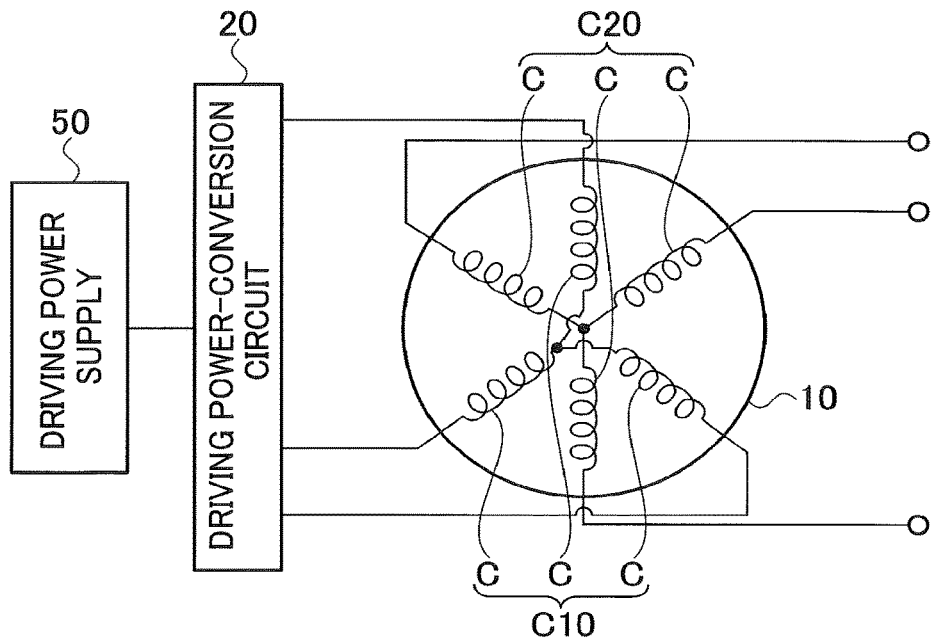
FIG. 24 is a schematic diagram illustrating the configuration of a rotary electric system according to a first modification of the embodiment of the present invention.

FIG. 24 illustrates a first modification of the embodiment of the present invention. The rotary electric system illustrated in FIG. 24 is different from that in FIG. 1 in not including the power-generating power-conversion circuit 30. The other configuration is the same as that of the rotary electric system illustrated in FIG. 1.

In the rotary electric system illustrated in FIG. 24, the power generated by the rotary electric device 10 is directly outputted to the outside from the second coil group C20. In a system utilizing the power generating operation of the rotary electric system as a standalone AC power supply, for example, the regenerative energy produced during deceleration may be directly outputted to the load as AC current.

Second Modification

Figure 25:
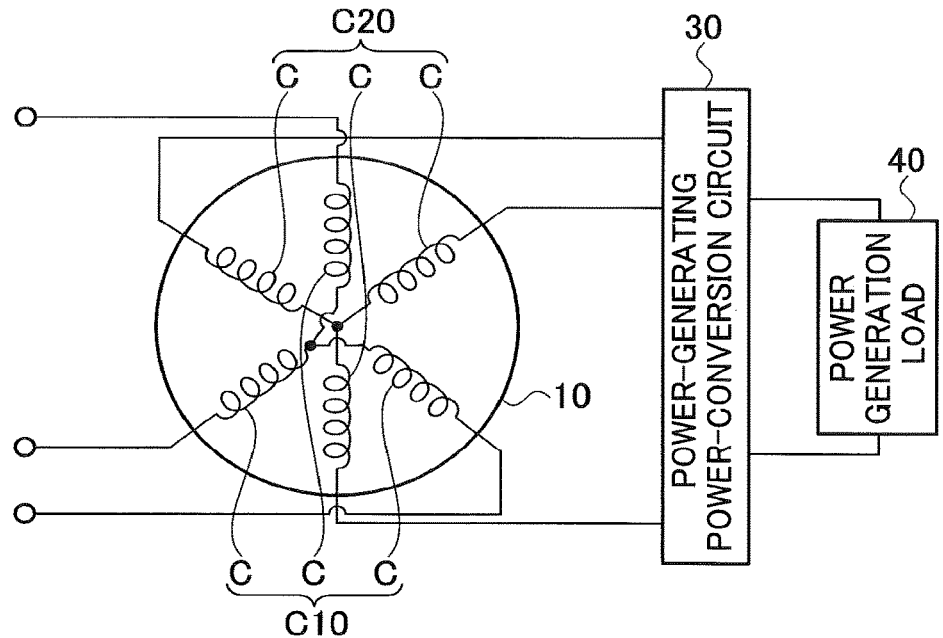
FIG. 25 is a schematic diagram illustrating the configuration of a rotary electric system according to a second modification of the embodiment of the present invention.

FIG. 25 illustrates a second modification of the embodiment of the present invention. The rotary electric system illustrated in FIG. 25 is different from that in FIG. 1 in not including the driving power-conversion circuit 20. The other configuration is the same as that of the rotary electric system illustrated in FIG. 1.

In the rotary electric system illustrated in FIG. 25, the power driving the rotary electric device 10 is directly inputted to the first coil group C10 without through the driving power-conversion circuit 20. The rotary electric device 10 may be driven with power supplied from a commercial power supply to the rotary electric device 10, for example.

Other Embodiments

As described above, the present invention is described based on the embodiment. However, it should not be understood that the description and drawings constituting a part of the disclosure will limit the present invention. This disclosure will allow those skilled in the art to understand various substitutions, examples, and operational techniques.

In the examination described above, the rotary electric device 10 includes the same structure as that of squirrel-cage induction motors or permanent magnet synchronous motors, for example. The rotary electric device 10 may include the same structure as another structure of induction motors or synchronous motors. Alternatively, the rotary electric device 10 may employ another structure, such as a structure of DC motors, for example, other than induction motors or synchronous motors.

In such a manner, it is certain that the present invention includes various embodiments not described herein and the like.

INDUSTRIAL APPLICABILITY

The rotary electric system of the present invention is applicable to a rotary electric system that simultaneously performs the motor driving operation and power generating operation.

The invention claimed is:

1. A rotary electric system, comprising:
a rotary electric device including:
    a stator provided with a stator winding; and
    a rotor, wherein
the stator winding includes:
    a first coil group that generates a rotating magnetic field to rotate the rotor; and
    a second coil group that generates power with induced electromotive force due to rotation of the rotor by the rotating magnetic field generated by the first coil group,
some coils of a series of coils arranged in a plurality of slots arranged along the circumference of the rotor are used for the first coil group while other coils of the series of coils are used for the second coil group, and
configurations of the first coil group and the second coil group are adjusted based on an output and speed of the rotary electric device, where the larger a required torque, the larger a number of coils in the first coil group and the smaller number of coils in the second coil group.

2. The rotary electric system according to claim 1, further comprising a driving power-conversion circuit that in conjunction with the first coil group, constitutes a driving polyphase alternating-current circuit configured to rotate the rotor.

3. The rotary electric system according to claim 2, wherein the current value and phase of current to be applied to the first coil group are adjusted in the driving power-conversion circuit to control torque to be generated by the rotary electric device.

4. The rotary electric system according to claim 3, further comprising a power-generating power-conversion circuit that in conjunction with the second coil group, constitutes a power generation polyphase alternating-current circuit configured to output the power generated by rotation of the rotor, to the outside.

5. The rotary electric system according to claim 4, wherein a ratio of a motor driving operation to rotate the rotor to a power generating operation to generate the power is controlled by adjusting on and off periods of a switching element of a converter circuit constituting the power-generating power-conversion circuit.

6. The rotary electric system according to claim 4, further comprising a power generation load that stores the power outputted from the power-generating power-conversion circuit, wherein
    the power stored in the power generation load is used to rotate the rotor.

7. The rotary electric system according to claim 6, wherein the power-generating power-conversion circuit and the power generation load implement a function to supply the power stored in the power generation load to the second coil group as an opposite flow of energy to that in the case where the power is stored in the power generation load and generate a rotating magnetic field to rotate the rotor.

8. The rotary electric system according to claim 3, wherein each of the first and second coil groups constitutes a three-phase alternating-current circuit.

9. The rotary electric system according to claim 3, wherein an output ratio of the output of the motor driving operation due to the first coil group and the output of the power generating operation due to the second coil group is adjusted to allow the rotary electric device to operate at an operating point where the total efficiency of an apparatus driven by the rotary electric device and the rotary electric device is maximized.

10. The rotary electric system according to claim 3, wherein q-axis current is applied to the first coil group while q-axis current of an opposite polarity to that of the first coil group is applied to the second coil group.

11. The rotary electric system according claim 3, wherein the rotary electric system performs a control to reduce terminal voltage of the rotary electric device under load by applying q-axis current to the first coil group while applying q-axis current of an opposite polarity to that of the first coil group to the second coil group.

* * * * *